(12) United States Patent
Lemaire (10) Patent No.: US 12,523,462 B2
(45) Date of Patent: Jan. 13, 2026

(54) METHOD AND SYSTEM FOR REPRESENTING AT LEAST PART OF A REAL-WORLD ENVIRONMENT

(71) Applicant: Trimble Inc., Sunnyvale, CA (US)

(72) Inventor: Charles Lemaire, Carquefou (FR)

(73) Assignee: Trimble Inc., Westminster, CO (US)

( * ) Notice: Subject to any disclaimer, the term of this patent is extended or adjusted under 35 U.S.C. 154(b) by 238 days.

(21) Appl. No.: 18/387,376

(22) Filed: Nov. 6, 2023

(65) Prior Publication Data
US 2025/0116502 A1    Apr. 10, 2025

(30) Foreign Application Priority Data
Oct. 6, 2023    (EP) .................................... 23202028

(51) Int. Cl.
*G01B 11/00* (2006.01)
*G01B 11/03* (2006.01)

(52) U.S. Cl.
CPC ............ *G01B 11/002* (2013.01); *G01B 11/03* (2013.01)

(58) Field of Classification Search
CPC ....... G01B 11/002; G01B 11/03; G01C 11/00; G01C 15/002; G06T 15/06
See application file for complete search history.

(56) References Cited

U.S. PATENT DOCUMENTS

| | | | |
|---|---|---|---|
| 4,689,748 A | 8/1987 | Hofman | |
| 10,898,757 B1 * | 1/2021 | Johansson | ............... G01S 13/66 |
| 2002/0048027 A1 * | 4/2002 | Pettersen | ............... G01C 11/06 |
| | | | 356/614 |
| 2018/0121750 A1 * | 5/2018 | Borkowski | ........... G01S 13/931 |
| 2019/0317215 A1 * | 10/2019 | Nagashima | ............. G01S 17/42 |
| 2022/0131998 A1 * | 4/2022 | Morovic | ................. G06N 20/20 |
| 2022/0303479 A1 * | 9/2022 | Danan | .................... G01S 7/4873 |
| 2022/0385867 A1 * | 12/2022 | Kim | ......................... H04N 9/31 |

OTHER PUBLICATIONS

Koutroumbas, K. D., "Piecewise Linear Curve Approximation Using Graph Theory and Geometrical Concepts," IEEE Transactions on Image Processing, vol. 21, No. 9, Sep. 2012, pp. 3877-3887.
Extended European Search Report for Application No. 23202028.9-1009, mailed Jun. 3, 2024, 9 pages.

* cited by examiner

*Primary Examiner* — Sang H Nguyen
(74) *Attorney, Agent, or Firm* — Kilpatrick Townsend & Stockton LLP (57) ABSTRACT

Provided is a computer implemented method for representing at least part of a real-world environment based on measurements performed by a measurement device. The method comprises transforming a ray from the first coordinate system to a second coordinate system used for representation of said measurements, sampling the transformed ray to be represented by a plurality of synthetic points, determining a discrepancy between the transformed ray and a straight line connecting the synthetic points, if the discrepancy is larger than a specific threshold value, reducing the specific distance between the synthetic points, and/or adding a new synthetic point between the synthetic points, performing a polynomial regression based on at least a subset of the synthetic points to determine a polynomial function representing the synthetic points, and thereby providing a correlation between the first coordinate system and the second coordinate system. An apparatus on which the method is implemented is also provided.

14 Claims, 4 Drawing Sheets

METHOD AND SYSTEM FOR REPRESENTING AT LEAST PART OF A REAL-WORLD ENVIRONMENT

CROSS-REFERENCE TO RELATED APPLICATIONS

This application claims priority to European Patent Application No. 23202028.9, filed Oct. 6, 2023, the entire contents of which are incorporated herein by reference for all purposes.

TECHNICAL FIELD

The present disclosure belongs to methods and systems for representing at least part of a real-world environment based on measurements performed by a measurement device.

BACKGROUND

Measurement devices configured to measure distances/directions, such as photogrammetry devices or laser scanning devices, in real-world environments have rapidly developed alongside with recent hardware and software development. For instance, laser scanning or photogrammetry devices having high resolution camera sensors may in principle provide highly accurate distance/direction measurement results. However, environmental factors, such as temperature or pressure variations (generating refraction of light), map projections originating from Earth's curvature, or geoid variations (Earth's gravitational equipotential surface), are unavoidably present, and may render a measurement equipped with inherent errors originating from these environmental factors no matter how accurate the measurement device itself is.

Hence, these measurement devices require to be compensated prior to being used to account for one or more of the above environmental factors. For a photogrammetry device, its camera needs being optically calibrated in terms of, e.g., focal length, lens distortion coefficients, etc. Next, an external calibration involving determining the position and orientation of the camera in the global coordinate system is needed, by utilizing, e.g., ground control points in conjunction with surveying techniques, such as Global Navigation Satellite System, GNSS, antennas or total stations, to accurately locate the camera in space. Further, optimization of parameters of the camera poses and 3D points in the environment to minimize reprojection errors may be made, thereby ensuring that the photogrammetric measurements are consistent across multiple images and viewpoints. A photogrammetric calculation may thereafter be carried out in a local tangential system, LTP, to avoid direct calculations in a projected coordinate system. Hence, a transformation between the LTP and the projected coordinate system is to be performed. A problem in connection hereto is an accurate transformation of photo orientations or other deliverables using such orientations. These deliverables are generally required in the projected system and not in a local cartesian coordinate system (such as the LTP). Two effects come into play with respect to this problem. The first is meridian convergence, being the main effect if only position/rotation is transformed, meaning that a bundle of rays are just shifted/rotated whereas directions of respective ray remain unchanged. Directions in the projected system are thus subject to increasing deviations at increasing distances away from the central meridian, which may negatively affect accurate measurements. The second effect is ray curvature of a ray upon transforming between the LTP and the projected system, meaning that deviations from a straight line may become more pronounced further away from the centre position (which, in aerial case, may correspond to the position where the camera points to the nadir).

To obtain a highly accurate representation of the real-world environment, at least some of these effects needs to be further accounted for.

Further, it is highly beneficial that obtaining such representation is sufficiently fast/efficient.

SUMMARY

An object of the present inventive concept is thus to provide an approach for representing at least part of a real-world environment upon accounting for one or more of the above-mentioned effects and/or environmental factors.

Another object is to provide a computationally efficient approach for representing at least part of a real-world environment upon accounting for one or more of the above-mentioned effects and/or environmental factors.

According to a first aspect of the inventive concept, there is provided a computer implemented method for representing at least part of a real-world environment based on measurements performed by a measurement device in said real-world environment. The method comprises:
- transforming a ray, represented by a line in a first coordinate system of said real-world environment, from the first coordinate system to a second coordinate system used for representation of said measurements, wherein the ray is emitted by a light-emitting source of the measurement device or received at the measurement device;
- sampling the transformed ray to be represented by a plurality of synthetic points, wherein the synthetic points are separated by a specific distance;
- determining a discrepancy between the transformed ray and a straight line connecting the synthetic points;
- if the discrepancy is larger than a specific threshold value, adding a new synthetic point between the synthetic points;
- performing a polynomial regression based on at least a subset of the synthetic points to determine a polynomial function representing the synthetic points, and thereby providing a correlation between the first coordinate system and the second coordinate system; and
- representing said at least part of the real-world environment using said correlation for transforming, to the second coordinate system, the coordinates of at least some of said measurements performed by the measurement device in said first coordinate system.

The method provides an overall improved approach for representing a real-world environment that may account for one or more artifacts such as refraction, map projection, and geoid height versus actual ellipsoid height, or the like. The polynomial regression may in principle provide an arbitrarily accurate correlation between the first and the second coordinate system. Since the polynomial function is a function of distance, any intermediate coordinate may be accurately represented. Relatively few measurements thus have to be made in order to represent at least part of the real-world environment.

The approach may find applications within laser scanning of the real-world environment. In such applications, a laser scanning of the real-world environment may omit transforming each space coordinate of interest in the real-world environment in favour of the presently described sampling-based transformation. This may facilitate a faster approach upon realistically representing/rendering the real-world environment on, e.g., a computer screen.

In such applications, the ray may be a ray emitted by a light-emitting source of the measurement device (the scanning device) or a ray absorbed by a sensor of the measurement device.

The sampled transformed ray may be refined systematically by the above-described steps for obtaining a trade-off between accuracy and computational speed of the execution of the method. For instance, by reducing the specific threshold value, a higher accuracy of the sampled transformed ray may be obtained, or vice versa. This may thus provide a computationally faster approach, thereby saving time for, e.g., personnel at a working site on which distance/directional measurements and/or mapping of the real-world environment take place. Additionally, or alternatively, the approach may facilitate a more precise representation of the real-world environment in that arbitrary precision in principle may be feasible.

Furthermore, convenience is facilitated considering it being easier to work in a projected system (second coordinate system) as conventional customer/user data is typically present in such a system.

While the measurements are performed in a first coordinate system, the representation of (at least part of) the real-world environment may thus be viewed as the working environment in which the measurements are exploited, for example for making calculations of, e.g., positions, orientations and/or distances.

Associated herewith, another advantage of the method is that, rather than working in a separate local coordinate system, an operator (or even multiple operators) may optionally transform the measurements to such a (common) working environment (i.e., representation), thereby benefiting from measurements done at other locations, other occasions and/or by other users/operators.

The number of synthetic points discussed throughout is at least two. If the number of synthetic points is more than two, the sampled transformed ray may be viewed as a polygonal chain comprising a sequence of consecutive pairs of synthetic points.

The method may be performed with the second coordinate system being one or more of:
- a coordinate system representing refraction of light in the real-world environment;
- a coordinate system representing a rotational ellipsoid to approximate a curvature of the real-world environment; and
- a coordinate system representing a gravitational equipotential geoid of the real-world environment.

Hence, real-world features/artifacts such as refraction and Earth's curvature may be accounted for by the presented approach. The method may thus account for said real-world features/artifacts subsequently by, e.g., starting by accounting for refraction of light in Earth's atmosphere followed by accounting for Earth's curvature, i.e., map projection artifacts. Calculation/estimation of each feature/artifact may be done independently. Alternatively, calculation/estimation of a specific feature/artifact may depend on a previous calculation/estimation in that output of an already made calculation/estimation is used as input in a subsequent calculation/estimation of another feature/artifact. For example, the method may start by a transformation made with respect to refraction of light outputting transformed coordinates or curve regression thereof, followed by transformation made with respect to Earth's curvature which may take already transformed coordinates as input. Clearly, numerous options are possible with regard to order of transformation, provided involved transformation matrices commute, which they generally do. Coordinates (e.g., the synthetic points) may thus be transformed subsequently whereafter a polynomial function is determined for the output (final) coordinates. Alternatively, one polynomial function may be determined for each of the above coordinate systems, whereafter combination of the determined polynomial functions is done. Alternatively, a final polynomial function may be determined by performing the method by accounting for all above-mentioned real-world features/artifacts, wherein any intermediate transformation takes as input already transformed coordinates from a previous transformation. Accuracy may hence be facilitated to provide more accurate mapping between the first and the second coordinate systems, and thus a more accurate representation of the real-world environment on, e.g., a computer screen. The present inventive concept provides the benefit of obtaining more accurate 3D information in the second coordinate system (or mapping system). For example, while aerial triangulation on a mapping system usually is inaccurate with oblique images, the transformation provided in the present concept removes any systematic error introduced in the mapping projection.

It is thus to be understood that the method steps may be repeatedly performed with one or more of the above-mentioned coordinate systems.

Hence, the step of transforming a ray may be performed subsequently for the above-mentioned coordinate systems.

The determining the discrepancy may comprise determining a maximal distance between the transformed ray and the straight line.

This option may facilitate a particularly efficient approach, hence saving time. Alternatively, the determining the discrepancy may further comprise determining an area between the transformed ray and the straight line. This may hence require (numerical) integration of said area, which, despite being computationally slower, may further facilitate accuracy in determining the discrepancy.

The polynomial function may be of second order.

A polynomial function of second order has proven to suffice in normal real-world environments in view of, e.g., artifacts originating from map projections, since such artifacts are in general small in view of the distance scales involved for the present approach, i.e., at the distances in normal measurement environments. Hence, this may facilitate saving computation time.

The method may further comprise repeating the steps for a plurality of rays, wherein each ray of the plurality of rays is directed in a specific direction.

Hence, a discrete angular grid may be determined wherein each ray undergo the above-described procedure. Accordingly, interpolation (possibly by another polynomial regression) between grid points of the angular grid may be performed to thereby provide an accurate representation of at least part of the real-world environment for any (intermediate) position and direction of the ray. The distribution of directions of the plurality of rays may be represented by, e.g., a Fibonacci sphere, at least approximatively due to difficulties in generating a perfect Fibonacci sphere. That is, upon considering an end point of respective ray originating from the measurement device, the end points lie on a sphere on which nearest neighbours from a specific end point are substantially mutually equidistant, i.e., evenly distributed points on a sphere. Other kinds of distributions of directions may however be possible within the scope of the claims.

According to a second aspect of the inventive concept, there is provided a non-transitory computer-readable storage medium having stored thereon program code portions for implementing the method according to the first aspect above when executed on a device having processing capabilities The above-mentioned features of the first aspect, when applicable, apply to the second aspect as well. In order to avoid undue repetition, reference is made to the above.

According to a third aspect of the inventive concept, there is provided an apparatus configured to represent, in a second coordinate system, measurements performed by a measurement device in a first coordinate system of a real-world environment, the representation being determined by the method according to the first aspect.

The above-mentioned features of the first aspect, when applicable, apply to the third aspect as well. In order to avoid undue repetition, reference is made to the above.

According to a fourth aspect of the inventive concept, there is provided a system configured to represent at least part of a real-world environment based on measurements performed in said real-world environment. The system comprises a light-emitting source for emitting a ray or a device for receiving the ray (such as for example a sensor device for detecting the ray), and circuitry. The circuitry is configured to execute:
- a transformation function configured to transform a ray, represented by a line in a first coordinate system, from the first coordinate system to a second coordinate system;
- a sampling function configured to sample the transformed ray to be represented by a plurality of synthetic points wherein the synthetic points are separated by a specific distance;
- a determining function configured to determine a discrepancy between the transformed ray and a straight line connecting the synthetic points;
- a refining function configured to, if the discrepancy is larger than a specific threshold value, add a new synthetic point between the synthetic points;
- a regression function configured to perform a polynomial regression based on at least a subset of the synthetic points to determine a polynomial function representing the synthetic points, thereby providing a correlation between the first coordinate system and the second coordinate system; and
- a representation function configured to represent said at least part of the real-world environment using said correlation for transforming, to the second coordinate system, the coordinates of at least some of said measurements performed by the measurement device in said first coordinate system.

The above-mentioned features of the first aspect, when applicable, apply to the fourth aspect as well. In order to avoid undue repetition, reference is made to the above.

The second coordinate system may be one or more of:
- a coordinate system representing refraction of light in the real-world environment;
- a coordinate system representing a rotational ellipsoid to approximate a curvature of the real-world environment; and
- a coordinate system representing a gravitational equipotential geoid of the real-world environment.

The transformation function may be further configured to subsequently transform a ray for the above-mentioned coordinate systems.

The determining function may be further configured to determine the discrepancy to be a maximal distance between the transformed ray and the straight line.

The polynomial function may be of second order.

The circuitry may be further configured to execute the functions for a plurality of rays, wherein each ray of the plurality of rays is directed in a specific direction.

A further scope of applicability of the present inventive concept will become apparent from the detailed description given below. However, it should be understood that the detailed description and specific examples, while indicating preferred embodiments of the inventive concept, are given by way of illustration only, since various changes and modifications within the scope of the inventive concept will become apparent to those skilled in the art from this detailed description.

Hence, it is to be understood that the present inventive concept is not limited to the particular component parts of the device described or acts of the methods described as such device and method may vary. It is also to be understood that the terminology used herein is for the purpose of describing particular embodiments only and is not intended to be limiting. It must be noted that, as used in the specification and the appended claims, the articles "a," "an," "the," and "said" are intended to mean that there are one or more of the elements unless the context clearly dictates otherwise. Thus, for example, reference to "a unit" or "the unit" may include several units, and the like. Furthermore, the words "comprising", "including", "containing" and similar wordings do not exclude other elements or steps.

BRIEF DESCRIPTION OF THE DRAWINGS

The above, as well as additional objects, features, and advantages of the present inventive concept, will be better understood through the following illustrative and non-limiting detailed description, with reference to the appended drawings. In the drawings like reference numerals will be used for like elements unless stated otherwise.

DETAILED DESCRIPTION

The present inventive concept will now be described more fully hereinafter with reference to the accompanying drawings, in which currently preferred variants of the inventive concept are shown. This inventive concept may, however, be embodied in many different forms and should not be construed as limited to the embodiments set forth herein; rather, these embodiments are provided for thoroughness and completeness, and to fully convey the scope of the inventive concept to the skilled person.

Figure 1:
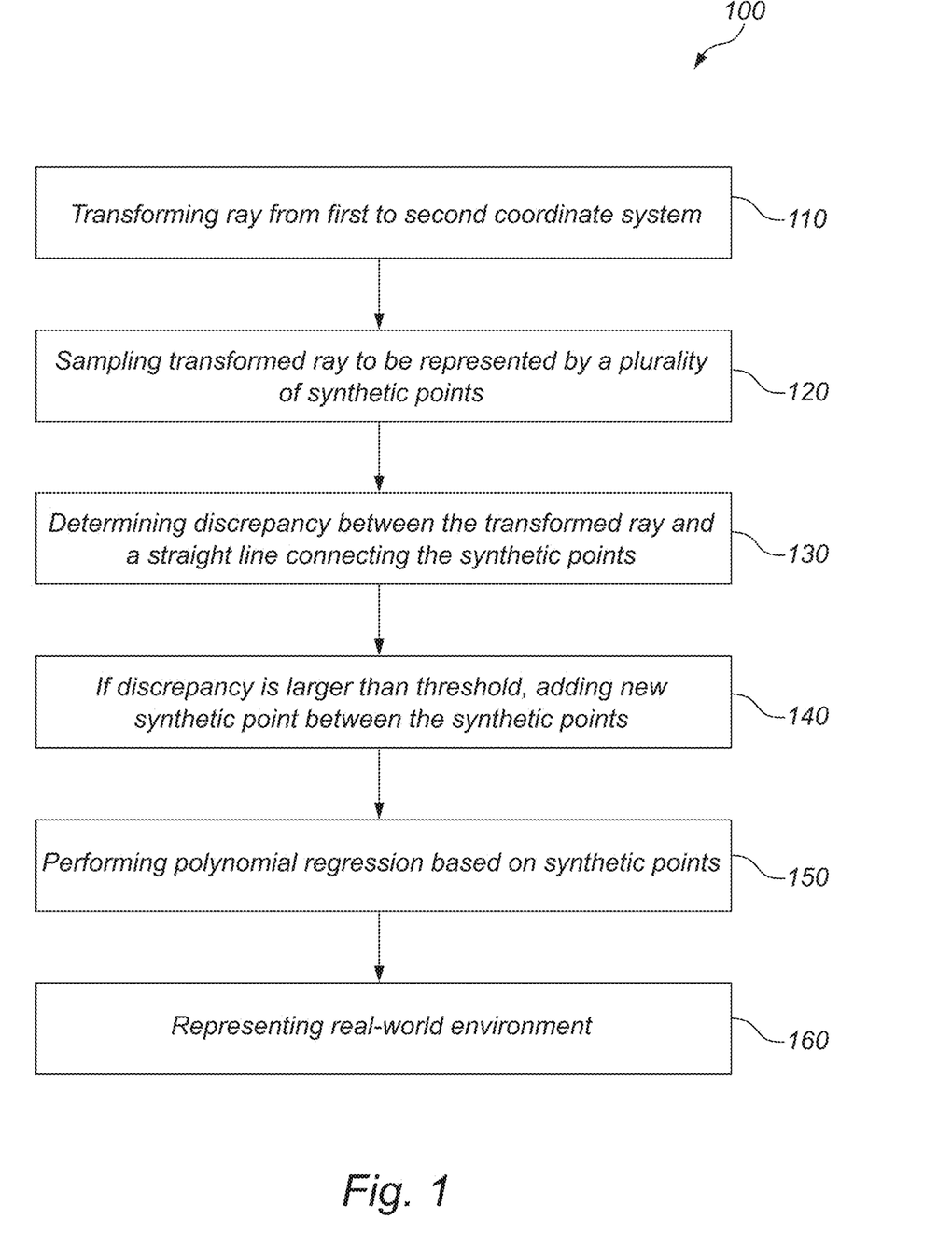
FIG. 1 shows a flowchart of a method for representing at least part of a real-world environment based on measurements performed by a measurement device.

FIG. 1 shows a flowchart of a method 100 for representing at least part of a real-world environment based on measurements performed by a measurement device in the real-world environment.

Figure 2:
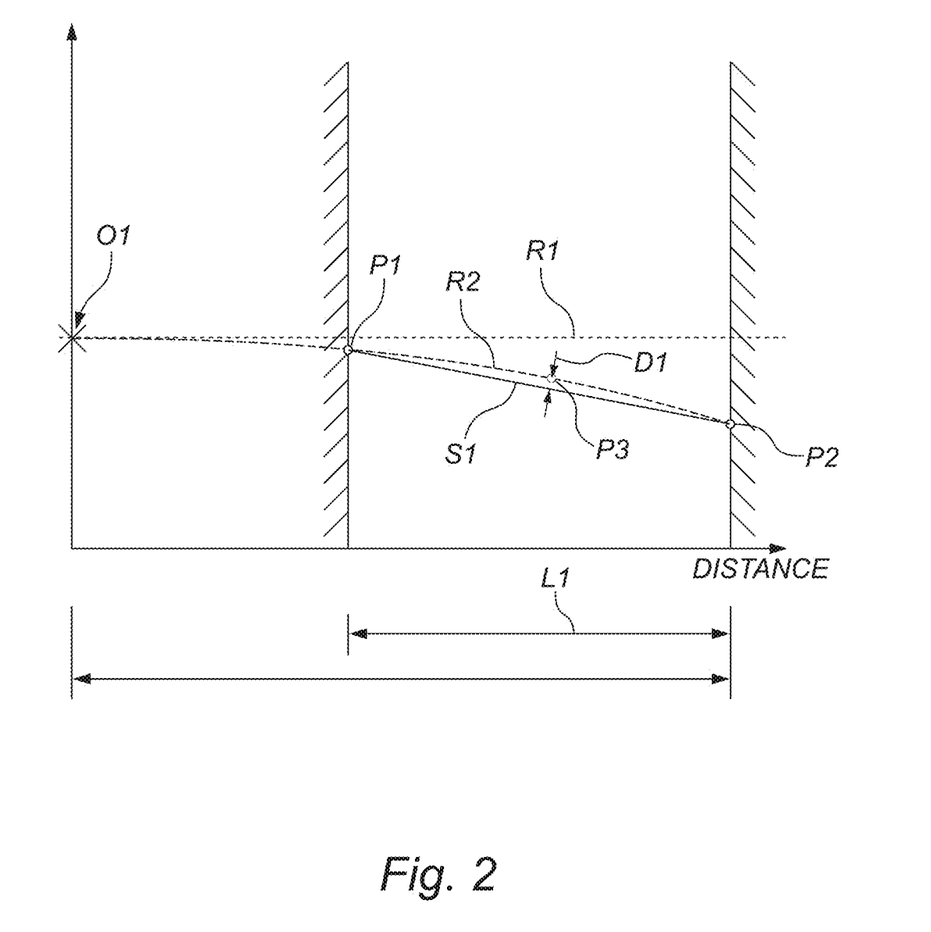
FIG. 2 schematically shows an example use case of the method.

FIG. 2 schematically shows an example use case of the method 100, where scales may be exaggerated for conceptual purposes. The vertical axis in FIG. 2 may represent a substantially vertical elevation from Earth's surface provided measurements are performed substantially horizontally. For measurements performed in other directions than horizontally, the vertical axis may have components in both the vertical height and horizontal directions. The horizontal axis (distance) may represent any horizontal direction on Earth's surface. Hence, if measurements are performed in other directions, this axis may have a vertical component as well. FIGS. 1 and 2 may preferably be viewed in parallel upon reading the description below.

The method 100 may serve as an initialisation procedure before performing actual distance and/or direction measurements in a real-world environment, e.g., bundle block adjustment (alignment) or generation of data that may be derived from a sensor measurement, e.g., an image sensor. This initialisation may be performed onsite, i.e., in the real-world environment, whereafter sensor measurements may be corrected (for example at a station that has been placed over a reference point, and/or where the station has a Global Navigation Satellite System, GNSS, Antenna that has been oriented with reference points). Alternatively, real-world environment measurements may be performed, whereafter corrections/correlations, determined by the method, may be accounted for in the measured data to thereby obtain a well-characterized representation of the real-world environment that accounts for one or more real-world artifacts (further described below).

The method 100 comprises transforming 110 a ray R1, represented by a line in a first coordinate system, from the first coordinate system to a second coordinate system. A location O1 of the measurement device 200 may be represented in the second coordinate system (here the term represented may alternatively be understood as identified or known, where applicable).

The line may be a straight line as depicted in FIG. 2. However, the line may be curved in events of, e.g., transforming an already transformed ray or transforming already transformed coordinates.

The first coordinate system may be a Euclidian coordinate system, such as a cartesian coordinate system. In connection with a local mapping of the world within photogrammetry, another commonly occurring example is a local tangential system, LTP, being a coordinate system established at a specific point on a surface of Earth. Conventionally, and also herein, the LTP is defined by that one of the coordinate axes is aligned with the local tangent to the surface at that point and allows for a more natural representation of coordinates in view of the surface geometry. For example, considering a point on Earth and an LTP with respect to that point, one axis would point north, another axis would point east (or west), and possibly yet another axis would point upward (vertically), i.e., perpendicular to Earth's surface.

The second coordinate system may be a non-Euclidian coordinate system. This may be viewed and/or referred to as a projected coordinate system (or a mapping system). A natural example in connection hereto is a spherical/elliptic coordinate system to approximately represent coordinates on Earth's surface. A common example is the approximation of Earth's surface as a rotational ellipsoid. Mapping distortions thus occur upon representing Earth's surface on a flat screen or paper. Hence, measuring a distance between two points elevated from Earth's surface along a straight line (e.g., a ray of a laser or the like) results in that the straight line does not follow the curvature of Earth. Put differently, a line drawn between two points on an ordinary world map would be bent (and follow the curvature of Earth's surface) if represented in the real-world environment. Hence, upon measuring a true distance between the two points requires accounting for the curvature of Earth such that a line connecting the two points has a constant elevation over the Earth's surface, assuming that the Earth's surface is mathematically defined as sphere, ellipsoid, pear shaped object (or any other approximate mathematical representations of Earth's surface geometry). However, a number of other effects may take place, such as differing elevation between the two points, or differing air pressures and/or temperature between real-world coordinates. In any event, the ray discussed herein is considered bent/curved to some extent in the second coordinate system. The second coordinate system may thus include one or more such other effects.

It is thus to be understood that the transformation of the ray from the first coordinate system to the second system is a priori known. The type of transformation thus depends on which artifact to be accounted for, and hence which coordinate transformation being selected/identified based on the artifact (e.g., refraction, map projection, etc.).

The location O1 of the measurement device may in connection with FIG. 2 be viewed as an origin of the first and the second coordinate system, e.g., a flat plane touching a curved plane in one point (i.e., origin O1). Hence, the ray R1 and the transformed ray R2 are herein depicted as having the same spatial direction (i.e., derivative/gradient) at the location O1 of the measurement device.

The method further comprises sampling 120 the transformed ray R2 to be represented by a plurality of synthetic points, wherein two of the synthetic points are separated by a specific distance L1. The sampling 120 may be defined by sampling the ray R1, i.e., the (straight) line, whereafter the sampling points of the ray R1 is vertically shifted to the transformed ray R2.

For simplicity, the specific distance L1 may be referred to a longitudinal distance L1 as seen in the first coordinate system. However, in principle, the specific distance L1 may equally well be an arc distance of the transformed ray R2, upon assuming a substantially linear relationship between the ray R1 (in the first coordinate system) and the transformed ray R2. The first synthetic point P1 may define a longitudinal starting point of a length interval (measurement interval) herein represented as the specific distance L1. The second synthetic point P2 may define a longitudinal end point of the length interval represented as the specific distance L1. The first synthetic point P1 is preferably located at a beginning of a usage/measurement distance; by way of example a minimal distance for which the measurement device can be used. The second synthetic point P2 is preferably located at an end of the usage/measurement distance. A sensor of the measurement device may determine the interval spanned between the beginning of the usage distance, i.e., at synthetic point P1, and the end of the usage distance, i.e., at synthetic point P2. This interval may thus throughout be referred to as the specific distance L1.

The method further comprises determining 130 a discrepancy D1 between the transformed ray R2 and a straight line S1 connecting the synthetic points P1, P2. If more than two synthetic points are present, discrepancies may be determined for each consecutive pairs of synthetic points. The determining 130 the discrepancy D1 may further comprise determining a maximal distance D1 between the transformed ray R2 and the straight line S1. Alternatively, the determining 130 the discrepancy D1 may further comprise determining an area between the transformed ray R2 and the straight line S1. Numerical integration, or, if applicable, analytical integration of the area may thus be utilized. As appreciated, analytical integration may be applicable should the transformed ray R2 be approximated by a mathematical function being integrable in a mathematically conventional sense. Alternatively, the determining 130 the discrepancy D1 may be computed at an intermediate synthetic point P3 being substantially centred between the first P1 and the second P2 synthetic points. Hence, the intermediate synthetic point P3 may be located at a distance being substantially half the specific distance L1 from the first synthetic point P1, and, thus, substantially half the specific distance L1 from the second synthetic point P2.

If the discrepancy D1 is larger than a specific threshold value a new synthetic point P3 may be added between the synthetic points P1, P2 of the at least one pair. The adding of the new synthetic point P3 thus creates two consecutive pairs of points, namely (pair 1) the first P1 and the new synthetic point P3, and (pair 2) the new synthetic point P3 and the second synthetic point P2. Determining a new discrepancy may thus be made for either or both of these two pairs, where the expected outcome is a reduced discrepancy between the sampled transformed ray and the transformed ray R2. Additionally, or alternatively, the specific distance between the synthetic points P1, P2 may be reduced. Hence, provided the transformed ray R2 is represented by a monotonically decreasing or increasing function (which is generally the case), the discrepancy D1 reduces and may thus be equal to or smaller than the specific threshold value. As appreciated, a new straight line connecting the synthetic points P1, P2 may equivalently be formed by reducing the distance between them.

Ultimately, the aim is to obtain a sampled transformed ray that sufficiently well approximates the transformed ray R2. The number of sampling points, i.e., the number of synthetic points and/or the distance between the synthetic points may depend on the curvature of the transformed ray R2. That is, a spatially rapidly varying transformed ray R2 generally requires a finer grid of synthetic points, whereas a slowly varying transformed ray R2 may be well represented on a sparser grid, as well-known from signal theory. In practice, however, the transformed ray R2 is slowly varying in space, and thus the number of synthetic points may be relatively low, e.g., as low as two or three synthetic points. The magnitude of the specific threshold value may depend on the magnitude of the specific distance L1. That is, the sampled transformed ray may be considered for a relatively large specific distance L1, e.g., ranging between 10 and 1000 meters, hence allowing the specific threshold value to be larger than in the case where the specific distance L1 ranges from, e.g., 10 to 50 meters. Put differently, sampled transformed rays obtained with different specific distances L1 may correspond to its respective transformed ray R2 despite being determined using different specific threshold values.

The method 100 further comprises performing 150 a polynomial regression based on at least a subset of the synthetic points P1, P2, P3 to thereby determine a polynomial function representing the synthetic points. That is, once the transformed ray R2 is sufficiently sampled by a set of synthetic points P1, P2, P3, a polynomial function is determined that approximates/represents the sampled transformed ray. Preferably, the polynomial regression is performed by taking as input synthetic points P1, P2, P3 present within or at the boundary of the specific distance L1 only. However, synthetic points possibly present outside the specific distance L1 may additionally be used in the polynomial regression within the scope of the claims. An error of the polynomial regression may be determined by comparing the output polynomial value with the ray R1 or the transformed ray R2 at a specific coordinate, e.g., the origin O1. Said error may be corrected/compensated for subsequently.

The above-described representation may, as appreciated, depend on a starting direction, i.e., an azimuth and a vertical angle of the ray in the mapping system computed from image coordinates and transformed orientation, as well as the distance to the object point. The polynomial regression may thus be applied for these three coordinates in mapping space (azimuth and vertical angle, and distance). A sufficiently fine polar grid (e.g., having approximately 2° spacing) may alternatively be used for interpolating corrections for directions in between.

The second coordinate system may be one or more of a coordinate system representing refraction of light in the real-world environment, a coordinate system representing a rotational ellipsoid to approximate a curvature of the real-world environment, and a coordinate system representing a gravitational equipotential geoid of the real-world environment. Hence, account may be taken for a plurality of real-world features/artifacts subsequently. By way of example, the method 100 may take as a second coordinate system a coordinate system accounting for refraction of light in Earth's atmosphere during a specific time/occasion when performing a measurement. On such a specific time/occasion, air pressure and air temperature may be measured whereafter refraction of a light ray may be estimated by a model. Hence, an output representation of the real-world environment accounting for refraction only may be viewed as an intermediate representation of the real-world environment. In practice, the method may be repeated by taking the second coordinate system as a coordinate system accounting for the physical geometry of Earth, which is normally mathematically represented as a rotational ellipsoid. Upon doing so, the method 100 may take as input coordinates already transformed by the refraction transformation above. Alternatively, the present transformation is performed independently of the refraction transformation (or any other previous transformation). The same applies for the case where account is to be taken for altitude, i.e., height above sea level. Conventionally, determining an altitude involves measuring a position of, e.g., a GPS device relative to the rotational ellipsoid that mathematically represents the average surface of Earth. However, a more general way of determining the altitude is to measure a position (having an altitude/height component) relative to a geoid representing a gravitational equipotential geoid of Earth. Such a geoid is a slowly varying closed surface that deviates at most approximately hundred meters from the average sea level of Earth, and accounts for mass irregularities on Earth's surface as well as inhomogeneities of the mass inside Earth, as well as tidal effects. Preferably, all of the three effects above (refraction, rotational ellipsoid, and geoid) are accounted for when executing the method 100 to achieve the most accurate representation of the real-world environment.

A preferable approach in view of the above is to apply refraction to a set of synthetic points $C1(x,y,z)$, $C2(x,y,z)$ to obtain a first set of transformed coordinates $C1r(x,y,z)$, $C2r(x,y,z)$. The first set of transformed coordinates $C1r(x,y,z)$, $C2r(x,y,z)$ are thereafter transformed from an LTP system to an earth-centred-earth-fixed, ECEF, system (e.g., the rotational ellipsoid discussed above) which generates a second set of transformed coordinates $C1r_{ECEF}(x,y,z)$, $C2r_{ECEF}(x,y,z)$. The second set of transformed coordinates $C1r_{ECEF}(x,y,z)$, $C2r_{ECEF}(x,y,z)$ are thereafter transformed to a geographic coordinate system, GCS, which generates a third set of transformed coordinates $C1r_{GCS}$(latitude, longitude, altitude), $C2r_{GCS}$(latitude, longitude, altitude), where the altitude coordinate refers to a vertical height relative to the rotational ellipsoid. Lateral coordinates of the third set of transformed coordinates, i.e., $C1r_{GCS}$(latitude, longitude), $C2r_{GCS}$(latitude, longitude), are thereafter transformed to a projected (map) system (east-west, E-N) to obtain a fourth set of transformed coordinates $C1r_{MAP}$(E,N), $C2r_{MAP}$(E,N). Height/altitude coordinates are finally obtained by transformation between a height relative to the rotational ellipsoid and a height relative to the gravitational equipotential geoid so that a final set of transformed coordinates may read $C1r_{FINAL}$(E,N,height), $C2r_{FINAL}$(E,N,height). Again, it is to be stressed that the example in this paragraph serves as one of many options possible to transform measured/involved coordinates. Different orderings are equally possible within the scope of the claims.

The polynomial function determined from the polynomial regression may be of second order. At least three synthetic points P1, P2, P3 along a specific direction is required in order to properly perform a polynomial regression that yields a second (quadratic) order function, since a quadratic polynomial has three coefficients (one coefficient for each of the squared, the linear, and the constant term). Hence, preferably, the first P1, the intermediate P3, and the second P2 synthetic points may be used in the polynomial regression. Further intermediate synthetic points (not shown) are also possible to account for upon determining a quadratic polynomial thereof. For example, least squares approaches may be utilized to obtain a quadratic function when considering more than three synthetic points. The polynomial may thus correct from the measurement device coordinates to the mapping system coordinates. For example (partly a repetition from the above), for a certain synthetic point being associated with an azimuthal elevation distance when present in a polar coordinate system, a refraction estimation may be applied to determine a true local point. Afterwards, this point may be transformed to the mapping system to thereby determine east/north/height coordinates. The height may be corrected with a geoid that mathematically represents the real-world environment. Such a mathematical representation may account for local irregularities, such as a hill/valley, etc. Further, a refraction correction may be applied to a point in the local coordinate system, i.e., the first coordinate system as denoted herein (the one in which the measurement device sits in, or that of a digital image captured in connection thereto). Utilization of observed air pressure and temperature (e.g., measured onsite) applied to the point in the first coordinate system may thus improve accuracy of the method further. Alternatively, utilization of a local atmosphere model to be applied to the point in the first coordinate system may be possible. Afterwards, the point may be transformed to the projected coordinate system, i.e., the second coordinate system as denoted herein.

The method 100 may further comprise receiving feedback from a user should the compensation of the measurement device deviate from expected results or additional measurements. The feedback may be implemented in the approach to further refine the method 100.

Figure 3:
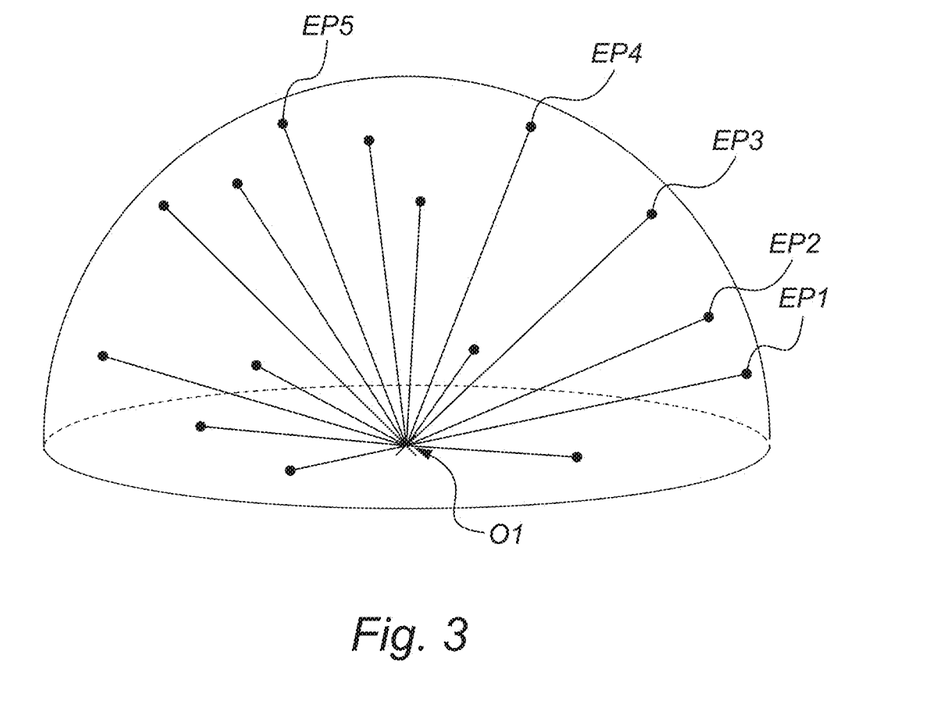
FIG. 3 shows a highly schematic distribution of direction of rays.

The method may further comprise repeating the above-described steps for a plurality of rays, wherein each ray of the plurality of rays is directed in a specific direction (see FIG. 3). Preferably a distribution of the directions of the plurality of rays may be substantially homogeneous. That is, assuming each ray of the plurality of rays has a finite length starting at the measurement device 200 and ending a certain distance away at a ray end point, the distribution of end points EP1, . . . , EP5 may lie on an abstract surface being approximately a half sphere on which a specific end point has substantially equal distance to each of its nearest neighbours, i.e., the end points EP1, . . . , EP5 may represent a Fibonacci sphere. Put differently, the plurality of rays may thus mutually differ by the same solid angle from the location O1 of the measurement device. Other distributions of directions/end points may be possible within the scope of the claims, such as a rectangular grid when viewed from a top view of the sphere or the like. A typical number of directions/end points may be of the order of hundred, preferably between 50 and 200 directions/end points. This feature is highly schematically represented in FIG. 3, in which a hemisphere (i.e., a half sphere) defined by endpoints of a small number of rays is depicted.

Respective end points EP1-EP5 of the sampled transformed rays may be located on a substantially same predefined distance from a common origin O1 of the sampled transformed rays. This facilitates further interpolation among the plurality of directions discussed above and may allow the number of rays/directions to be used being relatively small. Alternatively, and preferably, each end point EP1-EP5 is computed by means of a respective polynomial determined by said polynomial regression, implying that the end points do not necessarily form a perfect mathematical sphere.

The outcome of the above-described method may be represented on an apparatus configured to represent, in the second coordinate system, measurements performed by the measurement device in a first coordinate system of the real-world environment.

Figure 4:
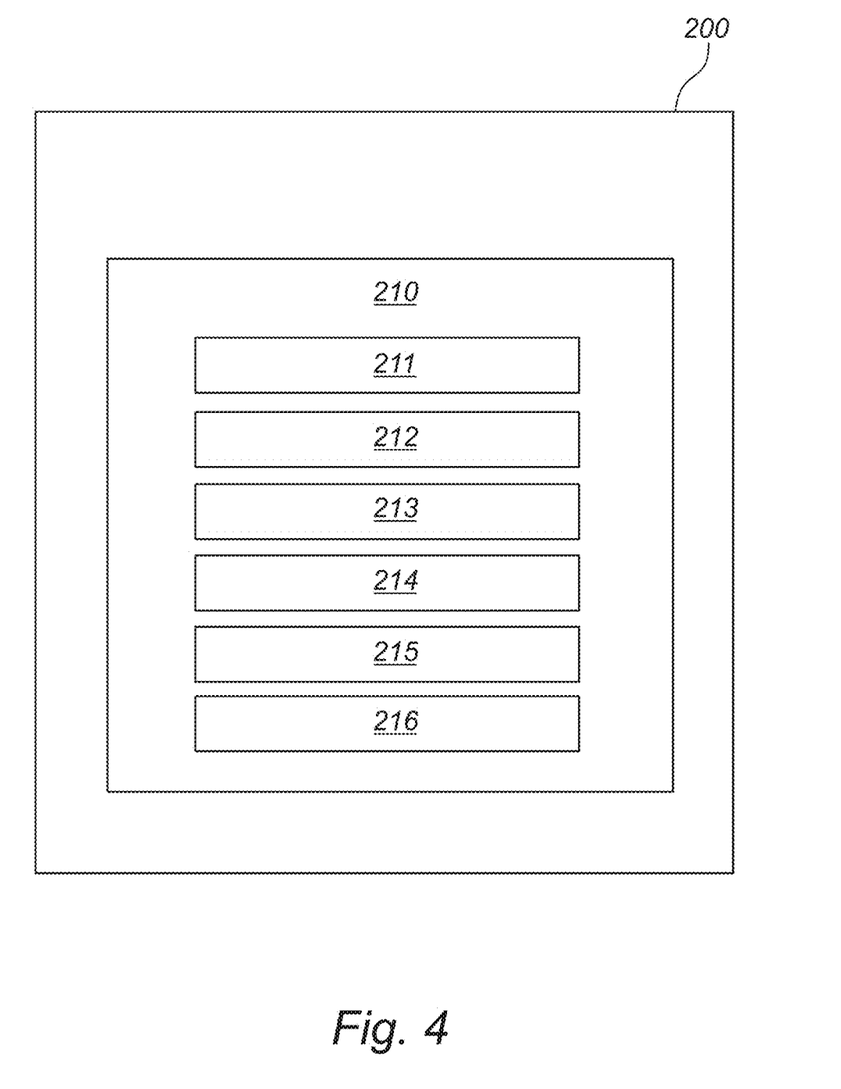
FIG. 4 shows a system configured to represent at least part of a real-world environment based on measurements performed by a measurement device.

FIG. 4 highly schematically depicts a system 200 configured to represent a real-world environment based on measurements performed by a measurement device in the real-world environment. Features in connection hereto have already been discussed above; hence, to avoid undue repetition, reference to some of the below features will be made to the above where applicable.

The system 200 may comprise means for emitting or absorbing a ray R1. The system 200 may for example comprise a sensor being a light sensitive sensor such as an image sensor. A "ray" in connection hereto may thus be viewed as a relatively narrow portion of light hitting a specific pixel of the image sensor. Alternatively, the system may comprise a light emitting source, such as a laser or the like. In this case, the ray may be viewed as a conventional laser beam or the like. In other applications, the measurement device may be a surveying pole, in which case the ray is either a ray transmitted from a light emitting source of the surveying pole or a ray received at an element, such as a prism, of the surveying pole.

The measurement device 200 comprises circuitry 210. At a general level, the circuitry 210 is configured to carry out overall control of functions and operations of the measurement device 200. The circuitry 210 may, e.g., be spatially separated from the measurement device 200. The circuitry 210 may include a processor, such as a central processing unit (CPU), microcontroller, or microprocessor. The processor is configured to execute program code stored in the circuitry 210 to carry out functions and operations of the measurement device 200. Executable functions, further described above and below, may be stored on a memory. The memory may be one or more of a buffer, a flash memory, a hard drive, a removable media, a volatile memory, a non-volatile memory, a random access memory (RAM), or other suitable devices. In a typical arrangement, the memory may include a non-volatile memory for long term data storage and a volatile memory that functions as system memory for the circuitry 210. The memory may exchange data with the circuitry 210 over a data bus. Accompanying control lines and an address bus between the memory and the circuitry 210 may be present.

Functions and operations of the circuitry 210 may be embodied in the form of executable logic routines, e.g., computer-code portions, software programs, etc., that are stored on a non-transitory computer readable medium, e.g., the memory, and are executed by the circuitry 210 by, e.g., using the processor. The functions and operations of the system 200 may be a stand-alone software application or form a part of a software application that carries out additional tasks related to the system 200. The described functions and operations may be associated with a method that the corresponding device is configured to carry out. Also, while the described functions and operations may be implemented in a software, such functionality may as well be carried out via dedicated hardware or firmware, or some combination of hardware, firmware and/or software.

Generally, the circuitry 210 is configured to account for features/artifacts in a real-world environment in which distance- or direction measurements are to be made.

More specifically, the circuitry 210 is configured to execute a transformation function 211 configured to transform a ray R1, represented by a straight line in a first coordinate system, from the first coordinate system to a second coordinate system. A location of the measurement device O1 may be represented in the second coordinate system.

The circuitry 210 is further configured to execute a sampling function 212 configured to sample the transformed ray R2 to be represented by a plurality of synthetic points P1, P2, wherein the synthetic points P1, P2 are separated by a specific distance L1.

The circuitry 210 is further configured to execute a determining function 213 configured to determine a discrepancy D1 between the transformed ray R2 and a straight line S1 connecting the synthetic points P1, P2.

The circuitry 210 is further configured to execute a refining function 214 configured to, if the discrepancy is larger than a specific threshold value, add a new synthetic point P3 between the synthetic points P1, P2.

The circuitry 210 is further configured to execute a regression function 215 configured to perform a polynomial regression based on at least a subset of the synthetic points P1, P2, P3 to determine a polynomial function representing the synthetic points P1, P2, P3, thereby providing a correlation between the first coordinate system and the second coordinate system.

The circuitry 210 is further configured to execute a representation function 216 configured to represent said at least part of the real-world environment using said correlation for transforming, to the second coordinate system, the coordinates of at least some of said measurements performed by the measurement device in said first coordinate system.

The second coordinate system may be one or more of a coordinate system representing refraction of light in the real-world environment, a coordinate system representing a rotational ellipsoid to approximate a curvature of the real-world environment, and a coordinate system representing a gravitational equipotential geoid of the real-world environment.

The transformation function 211 may be configured to subsequently transform a ray for the above-mentioned coordinate systems.

The determining function 213 may be further configured to determine a maximal distance between the transformed ray and the straight line.

The polynomial function may be of second order.

The circuitry 210 may be further configured to executing at least some of the above-mentioned functions for a plurality of rays, wherein each ray of the plurality of rays is directed in a specific direction.

Accordingly, and in summary, in some variants discussed above, there has been described methods and systems in an approach including approximating a ray between two coordinate systems by sampling the ray as represented in the second coordinate system by two or more points for which a polynomial regression is performed to obtain an approximate function that well describes the transformed ray. The output function is thus a function of distance, and hence an approximate description of the correlation between the two coordinate systems at all intermediate spatial coordinates may be obtained. This may be repeated for a plurality of different types of transformations accounting for real-world artifacts such as refraction of light, and different types of mathematical descriptions of Earth's geometry. By further repeating the above for a plurality of directions in space, an accurate representation of the real-world environment may be obtained.

The person skilled in the art realizes that the present inventive concept by no means is limited to the preferred embodiments described above. On the contrary, many modifications and variations are possible within the scope of the appended claims. Variations to the disclosed embodiments can be understood and effected by the skilled person in practicing the claimed invention, from a study of the drawings, the disclosure, and the appended claims.

The invention claimed is:

1. A computer implemented method for representing at least part of a real-world environment based on a ray emitted by a light-emitting source of a measurement device or received at the measurement device in said real-world environment, the method comprising:
    representing the ray as a line in a first coordinate system of said real-world environment;
    transforming the ray from the first coordinate system to a second coordinate system, used for representing the real-world environment, to provide a transformed ray;
    sampling the transformed ray to be represented by a plurality of synthetic points, wherein the synthetic points are separated by a specific distance;
    determining a discrepancy between the transformed ray and a straight line connecting the synthetic points;
    if the discrepancy is larger than a specific threshold value, adding a new synthetic point between the synthetic points;
    using at least a subset of the synthetic points to determine a polynomial function representing the synthetic points, and thereby providing a correlation between the first coordinate system and the second coordinate system; and
    representing said at least part of the real-world environment on a computer screen using said polynomial function to transform, to the second coordinate system, coordinates of at least some measurements performed by the measurement device in said first coordinate system.

2. The method according to claim 1, wherein the second coordinate system is one or more of:
    a coordinate system representing refraction of light in the real-world environment;

a coordinate system representing a rotational ellipsoid to approximate a curvature of the real-world environment; and a coordinate system representing a gravitational equipotential geoid of the real-world environment.

3. The method according to claim 2, wherein the step of transforming the ray is performed subsequently for the coordinate system representing the refraction of light, the coordinate system representing the rotational ellipsoid, and the coordinate system representing the gravitational equipotential.

4. The method according to claim 1, wherein the determining the discrepancy further comprises determining a maximal distance between the transformed ray and the straight line.

5. The method according to claim 1, wherein the polynomial function is of second order.

6. The method according to claim 1, further comprising: repeating the steps for a plurality of rays, wherein each ray of the plurality of rays is directed in a specific direction.

7. A non-transitory computer-readable storage medium having stored thereon program code portions for implementing the method according to claim 1 when executed on a device having processing capabilities.

8. An apparatus configured to represent, in a second coordinate system, measurements performed by a measurement device in a first coordinate system of a real-world environment, the representation being determined by the method according to claim 1.

9. A system configured to represent at least part of a real-world environment based a ray emitted by a light-emitting source of a measurement device or received at the measurement device in the real-world environment, the system comprising the light-emitting source for emitting the ray, a sensor for detecting the ray or an element for receiving the ray, and circuitry configured to execute operations comprising:

representing the ray as a line in a first coordinate system of said real-world environment;

transforming the ray from the first coordinate system to a second coordinate system, used for representing the real-world environment, to provide a transformed ray;

sampling the transformed ray to be represented by a plurality of synthetic points, wherein the synthetic points are separated by a specific distance;

determining a discrepancy between the transformed ray and a straight line connecting the synthetic points;

if the discrepancy is larger than a specific threshold value, adding a new synthetic point between the synthetic points;

using at least a subset of the synthetic points to determine a polynomial function representing the synthetic points, thereby providing a correlation between the first coordinate system and the second coordinate system; and representing said at least part of the real-world environment on a computer screen using said polynomial function to transform, to the second coordinate system, coordinates of at least some measurements performed by the measurement device in said first coordinate system.

10. The system according to claim 9, wherein the circuitry is configured to execute the operations with the second coordinate system being one or more of:

a coordinate system representing refraction of light in the real-world environment;

a coordinate system representing a rotational ellipsoid to approximate a curvature of the real-world environment; and a coordinate system representing a gravitational equipotential geoid of the real-world environment.

11. The system according to claim 10, wherein the ray is transformed for the coordinate system representing the refraction of light, the coordinate system representing the rotational ellipsoid, and the coordinate system representing the gravitational equipotential.

12. The system according to claim 9, wherein the discrepancy is determined to be a maximal distance between the transformed ray and the straight line.

13. The system according to claim 9, wherein the polynomial function is of second order.

14. The system according to claim 9, wherein the circuitry is further configured to execute the operations for a plurality of rays, wherein each ray of the plurality of rays is directed in a specific direction.

* * * * *